United States Patent [19]

Hainsworth et al.

[11] 4,379,497
[45] Apr. 12, 1983

[54] VEHICLE COLLISION AVOIDANCE SYSTEM

[75] Inventors: Thomas E. Hainsworth, Holland; Robert W. Houskamp, Grand Rapids, both of Mich.

[73] Assignee: Bell & Howell, Company, Chicago, Ill.

[21] Appl. No.: 183,241

[22] Filed: Sep. 2, 1980

[51] Int. Cl.³ .............................................. B62D 1/28
[52] U.S. Cl. .................................. 180/168; 318/587; 340/33; 343/7 A
[58] Field of Search ............... 180/168, 167, 169, 271; 340/33; 318/587; 246/30, 182 A, 182 R; 104/88, 299; 343/7 A; 364/436

[56] References Cited

U.S. PATENT DOCUMENTS

| | | | |
|---|---|---|---|
| 1,266,389 | 5/1918 | Betz | 246/30 |
| 3,235,025 | 2/1966 | Quinn | 180/167 |
| 3,506,823 | 4/1970 | Failor | 246/66 |
| 3,594,571 | 7/1971 | Schonbrodt et al. | 246/66 |
| 3,610,363 | 10/1971 | Hartley | 180/168 |
| 3,839,717 | 10/1974 | Paul | 343/6.5 LC |
| 3,876,940 | 4/1975 | Wickord et al. | 340/33 |
| 4,003,445 | 1/1977 | DeBruine | 180/168 |
| 4,284,160 | 8/1981 | DeLiban et al. | 180/168 |

FOREIGN PATENT DOCUMENTS 54-105677  8/1979  Japan .................................. 180/168

*Primary Examiner*—David M. Mitchell
*Attorney, Agent, or Firm*—Varnum, Riddering, Wierengo & Christenson

[57] ABSTRACT

An automatically guided vehicle (110) is disclosed which follows guide lines positioned in a predetermined guide path (102) on the floor. The guide path (102) includes coded markings and the vehicle comprises sensing circuitry (210) capable of sensing the markings and generating proximity signals indicative thereof. The coded markings can indicate approach of the vehicle into a "congestion" zone wherein other vehicles similarly situated can cause hazardous conditions therein. Radio frequency (RF) transmission circuitry (240) on the approaching vehicle (110) is responsive to the congestion zone indication signals to transmit and receive RF signals to and from other vehicles on the guide path (102). The approaching vehicle (110) performs various collision avoidance operations as determined by the received RF signals.

17 Claims, 13 Drawing Figures

VEHICLE COLLISION AVOIDANCE SYSTEM

TECHNICAL FIELD

This invention relates to automatically controlled vehicles and, more particularly, relates to collision avoidance systems adapted to minimize the probability of collisions between vehicles at hazardous locations along a followed guide path.

BACKGROUND OF THE INVENTION

Automated vehicles and guidance systems associated therewith have been commercially developed whereby the vehicles effectively "track" a predetermined guide path comprising guide lines on a floor surface. Exemplary vehicles and guidance systems are disclosed in commonly assigned U.S. Pat. Nos. 3,935,922; 3,970,840; and 4,003,445. The vehicles disclosed in these patents can be adapted for specific uses such as floor maintenance, mail delivery, and similar functions routinely performed within industrial and commercial organizations.

When these vehicles are performing functions such as mail delivery and material handling, the organization to be serviced can require two or more vehicles to be operating simultaneously. Further, the structural "layout" of the organization can require the guide path to comprise intersecting guide lines and predesignated sections such as "unloading" zones and the like.

As the nature of guided vehicle functions become more sophisticated, and as the user organization places increasing reliance on the vehicles by simultaneously employing an extensive number thereof, an increase in the probability of "hazardous" situations becomes apparent. For example, the simultaneous use of two or more vehicles on a guide path having intersecting guidelines implies a finite probability of collision. To minimize this probability, a collision avoidance system can be utilized. However, such a system must be capable of not only preventing collisions, but must do so in an optimal and efficient manner which does not cause traffic "bottlenecks" or similar situations necessitating manual intervention.

Several prior art systems include apparatus directed to collision avoidance between driverless vehicles which automatically follow various types of guide paths. For example, the U.S. patent to Schonbrodt U.S. Pat. No. 3,594,571, issued July 20, 1971, discloses a collision avoidance system for two driverless vehicles traveling in the same direction along a guide rail. The guide rail comprises overlapping conductor loops disposed on opposite sides thereof. Transmitters mounted on the vehicles provide signals which can be received by other vehicles. Various circuit apparatus causes the following vehicle to stop if it is within the same conductive loop area as the leading vehicle. However, the Schonbrodt system does not appear adaptable to systems employing embodiments thereof for more than two vehicles or having vehicles which track along separate but intersecting guide lines.

The U.S. patent to Hartley U.S. Pat. No. 3,610,363 issued Oct. 5, 1971, discloses an automatic vehicle guidance system having "decision" points disposed along a track layout and circuitry at each decision point for deriving the unique identity of a vehicle arriving thereat. All of the vehicles are controlled from computer apparatus remote from the vehicles and track layout. The centralized computer complex is capable of applying "run" signals to the individual vehicles and to inhibit such signals if received data indicates that other vehicles are on the track to which the identified vehicle is to be transported. This system has the limitations of requiring a fairly complex centralized computer system for purposes of control and further requiring substantial information to be transmitted between the guide track system and the central computer.

SUMMARY OF THE INVENTION

Advantageously, a technical advance is achieved in a system comprising automatically controlled vehicles operating on a guide path having intersecting guide lines wherein a vehicle approaching a congestion zone surrounding a guide path intersection can communicate with other vehicles and movement of the communicating vehicle can be manipulated to preclude collisions with other vehicles. The system includes means for transmitting blocking signals indicating the presence of a vehicle within a congestion zone and means to detect clearance of the congestion zone.

The system comprises first and second vehicles substantially identical with each other and each having sensing means connected thereto for sensing vehicle position on the guide path and generating proximity signals indicative thereof. Each vehicle also comprises energizing means to establish vehicular motion and communication means for receiving communication signals from other vehicles. Control means are connected to the sensing means and are responsive to the proximity signals and the received communication signals for applying information signals to the communication means representative of vehicle position on the guide path. The communication means is responsive to the applied information signals for transmitting corresponding communication signals to the other vehicles.

Code means on the guide path provide unique identification of corresponding locations thereof and identify approach to a specific guide path intersection and the congestion zone there surrounding. The sensing means is responsive to passage of the vehicle over the code means and the proximate signals include identification of the code means. The control means responds to the identifying proximity signals and the applied information signals generated therefrom include polling signals requesting responsive transmission of signals from other vehicles presently within the congestion zone.

The communication signals received by the communication means include blocking signals indicative of other vehicles presently in the collision zone. The communication means is responsive to these blocking signals to apply corresponding information signals to the control means. The control means responds to the signals indicating blockage by ceasing application of energizing signals to the energizing means, thereby stopping movement of the vehicle.

The control means also applies additional polling signals to the communication means at sequential intervals of time. When all other vehicles are clear of the congestion zone, the communication means receives no blocking signals responsive to the sequentially transmitted polling signals. The control means is responsive to the absence of received blocking signals to again apply energizing signals and establish vehicular motion, thereby moving the vehicle through the congestion zone.

The system includes means for determining the distance travelled by the vehicle in the congestion zone and the code means includes means for indicating clearance of the vehicle from the collision zone. While the vehicle is within the congestion zone, communication signals are transmitted by the communication means indicating vehicle presence in the congestion zone in response to received communication signals requesting such blocking signals.

A method for achieving the advantages of the invention and prohibiting collision situations between first and second vehicles automatically guided along a guide path having intersecting guide lines comprises the steps of sensing the approach of the first vehicle to a guide path intersection and generating proximity signals indicative thereof. In response to the proximity signals, polling signals are transmitted to the second vehicle. The first vehicle then waits a predetermined period of time and generates energizing signals to establish movement of the vehicle through the guide path intersection in the absence of received communication signals during the predetermined period of time.

The method further comprises the transmission of blocking signals from the second vehicle in response to the polling signals from the first vehicle when the second vehicle is within the predetermined zone surrounding the guide path intersection. In response to the transmitted blocking signals received from the second vehicle, the first vehicle ceases movement and additional polling signals are transmitted by the first vehicle at predetermined intervals of time requesting indication of clearance by the second vehicle from the congestion zone.

DESCRIPTION OF THE DRAWINGS

The invention will now be described with reference to the drawings in which.

DETAILED DESCRIPTION

Figure 1:
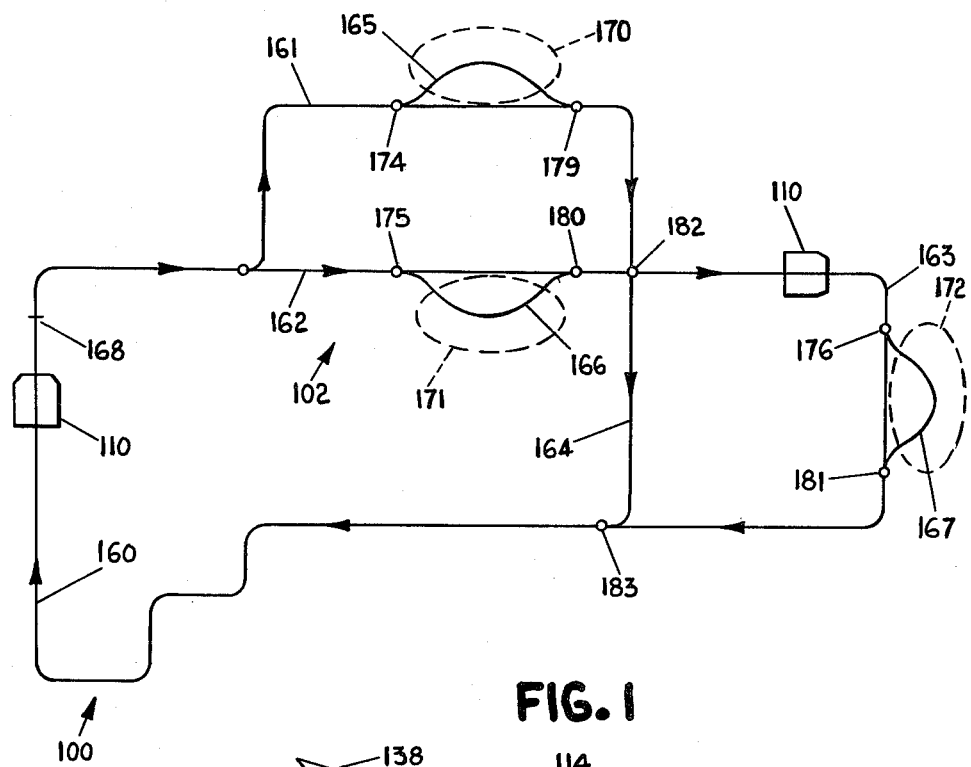
FIG. 1 depicts an automated vehicle transport arrangement in accordance with the invention.

The principles of this invention are disclosed, by way of example, in an automated vehicle guidance and transport arrangement 100 as depicted in FIG. 1. A system of this type can be utilized for performing functions such as transportation of materials between various locations of an industrial plant. Automated self-propelled vehicles 110 selectively travel a guide path 102 located on floor surfaces and disposed throughout the plant as necessitated by the particular transport functions required. The guide path 102 can comprise a plurality of interconnected guide lines 160 through 167 and the vehicles 110, by means substantially independent of the present invention, can be made to selectively follow certain of the guide lines as dependent on the functions to be performed. For purposes of descriptive understanding, it will be assumed that vehicle travel along the guide lines is unidirectional as indicated by the arrows in FIG. 1. However, bidirectional travel along the guide path 102 is clearly within the scope of the invention. The various guide lines of guide path 102 can comprise any suitable detectable material such as photosensitive tape or fluorescent material. Preferably, the system used is the fluorescent guide line system disclosed and claimed in the Cooper et al. U.S. Pat. No. 3,935,922.

Designating position 168 on guide line 160 as as initial "home" location from which the vehicles 110 begin travel, the vehicles can be made to follow one of several "routes" comprising selective guide lines of path 102. The sections of guide path 102 depicted in FIG. 1 comprising guide lines 165 through 167 are areas wherein materials can be loaded or unloaded from the vehicles 110. For purposes of description, these areas are designated as "drop zones" 170 through 172 and substantially correspond to areas surrounding guide lines 165 through 167, respectively. By means independent of the present invention, the routes traveled by vehicles 110 can selectively include a stop at a particular drop zone or bypass of the same. In actual operation, the general routes traveled by the vehicles 110 would be made dependent in part on the predetermined specific drop zones at which the vehicles are to stop. When material loading or unloading of a vehicle 110 within a drop zone is completed, the vehicle can be activated to again establish motion along path 102.

Also depicted in FIG. 1 are various guide line "intersections" 174 through 183, where at least two guide lines have a common position. The intersections 174 through 176 will be traversed by a vehicle 110 upon entering or bypassing the drop zones 170 through 172, respectively. Similarly, intersections 179 through 181 are traversed by the vehicles when bypassing or leaving respective drop zones 170 through 172. The intersections 182 and 183 each comprise other locations where vehicles travelling two of the intersecting guide lines can be simultaneously approaching the intersection.

With a plurality of vehicles 110 automatically following guide path 102, it is apparent that a finite probability of collisions therebetween can exist. Such collisions can especially occur at the intersections 174 through 183 heretofore described. Accordingly, the areas surrounding these intersections are designated as "congestion zones". For example, as a vehicle 110 within drop zone 170 is activated to begin further travel, another vehicle 110 can be bypassing drop zone 170 and approaching intersection 179. Further, two of the vehicles 110, one travelling along guide line 164 while the other travels along line 163, can simultaneously be approaching intersection 183. In accordance with the invention, the transport arrangement 100 comprises collision avoidance means to minimize the probability of collisions within the congestion zones without necessitating manual intervention. An illustrative embodiment of a collision avoidance system in accordance with the invention as it is interconnected and functionally operates within arrangement 100 is described in the subsequent paragraphs hereof.

Figure 2:
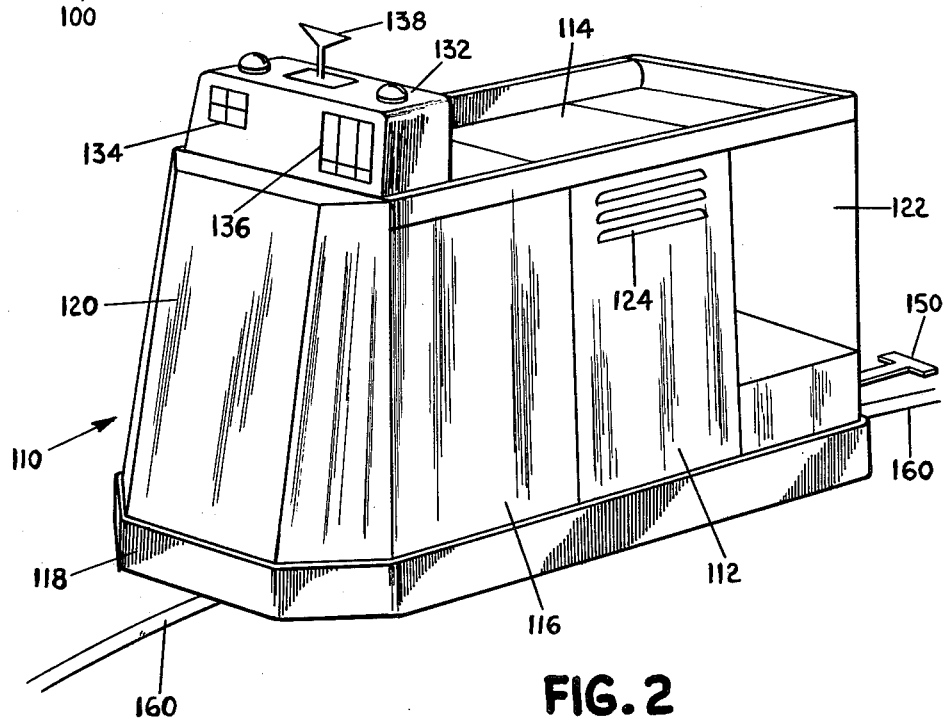
FIG. 2 is a perspective view depicting an automatically controlled vehicle operable in accordance with the invention.

Referring to FIG. 2, an illustrative embodiment of one of the vehicles is shown positioned along a particular guide line 160 of the guide path 102 depicted in FIG. 1. The vehicle 110 is powered by storage batteries located in battery compartment 112 having vents 124 and accessible through access door 114. Various circuitry subsequently described herein which can be mounted on conventional circuit boards or similar devices are located forward of battery compartment 112 within an electronics compartment 116. the vehicle 110 also comprises a base 118 and a forward shield 120. Storage area for the vehicle is located in the rear section thereof in compartment 122.

An external module 130 is located on the upper portion of the vehicle 110 and comprises a pair of caution lights 132, a conventional electronic display screen 134, a conventional manually programmable keyboard 136, and a radio frequency (RF) antenna 138. The caution lights 132 provide a means for visually indicating specific vehicle operations. For example, the caution light 132 on the left side of the vehicle can be actuated when the vehicle is turning left onto a new guide line at an intersection. The display screen can be utilized with associated conventional circuitry to numerically display such coded information as the predetermined route to be followed by the vehicle. Keyboard 136 allows manual input of numerically coded information such as the drop zones at which the vehicle is to stop. All of the aforementioned apparatus of vehicle 110 are merely exemplary of devices which can be utilized to provide means for interaction between users and control circuitry of the automated vehicle. Other apparatus, such as GO/STOP control switches and similar devices can be utilized with a collision avoidance system in accordance with the invention.

The RF antenna 138 is connected to conventional transmission/reception circuitry subsequently described herein and in combination therewith provides a means for intercommunication between the vehicles 110. Such antennae are well-known in the electrical communication arts. The vehicle 110 depicted in FIG. 2 further comprises a trailer hitch 150 or similar device to interconnect the vehicle with carriages to provide greater transport capacity. A self-propelled vehicle similar to that shown in FIG. 2 is generally described and depicted in commonly assigned U.S. Pat. Application Ser. No. 966,885, DeBruine, filed Dec. 6, 1978, now U.S. Pat. No. 4,307,791 issued Dec. 29, 1981.

Figure 3:
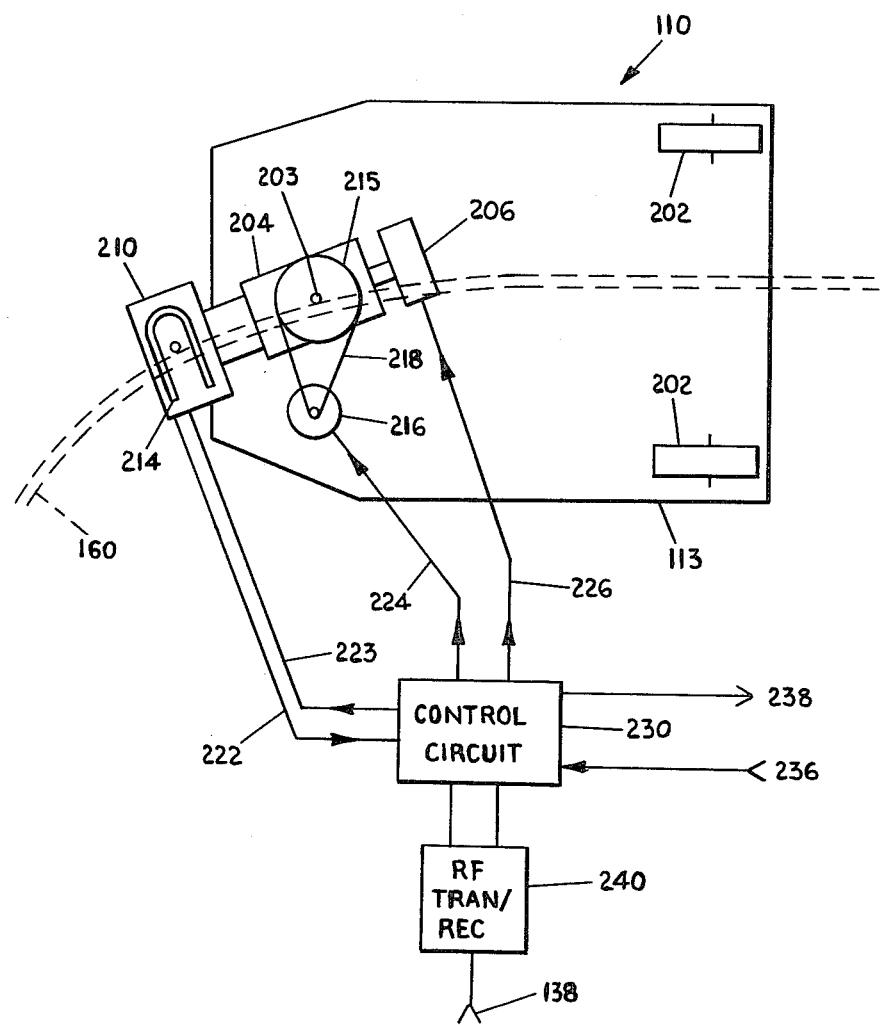
FIG. 3 is a structural and schematic block diagram of a plan view of the vehicle shown in FIG. 2 and illustrates the sensor head connections thereof.

Referring now to FIG. 3 which depicts the underside of one of the exemplary vehicles 110 and a block diagram of associated circuitry, the vehicle base 118 comprises rear wheels 202 and a front traction steerable wheel 204. A drive motor 206 is connected to the wheel 204 in conventional fashion, for example, a chain (not shown) to drive the wheel 204. The steerable wheel 204 is mounted on a pivot pin 208 about which the wheel is free to rotate. A sensing head 210 is mounted to the pivotable mechanism for the wheel 204 through a suitable frame 212. Thus, the sensing head 210 is pivotably movable along with the wheel 204 so that if the unit is maintained over the center of the exemplified guide line 160, the wheel 204 is continuously placed in a direction such that the vehicle will follow the guide line 160. The sensing head 210 incorporates a U-shaped ultraviolet tube 214 to illuminate the surface beneath the sensing head 210. A sprocket 215 is mounted on the pivot pin 208 for the steerable wheel 204 and is connected to a reversible steering motor 216 through a drive chain 218.

In operation, the sensing head 210 detects the position of the head with respect to the guide line 160, generates an intelligence signal on transmission line 222 with a polarity related to any lateral deviation of the sensing head 210 from the guide line 160 and applies the intelligence signal to control circuit 230. The sensing head 210 also operates to sense code means maintained on the floor surface as subsequently described herein. Accordingly, the intelligence signal also comprises signals indicative of the sensed code means.

The guide line 160 is illuminated and excited by the U-shaped ultraviolet tube 214. Output signals from control circuit 230 are applied to the steering motor 216 through transmission line 224 to rotate the wheel either clockwise or counterclockwise, depending on the deviation of the sensing head 210 from the guide line 160. To this end, the steering motor 206 rotates the sprocket 216 through chain 218 to thereby rotate the wheel 204 about the pivot pin 208. Additional output signals are applied to the traction motor 206 on line 226 to provide energy to the motor and thereby establish motion of vehicle 210.

A sensing head apparatus of the type depicted in FIG. 3 is generally disclosed in detail in the aforementioned DeBruine patent application. The present invention is independent of any particular sensing apparatus and further independent of any particular steering or guidance arrangement associated with the controlled vehicles 110. The control circuit 230 is electrically connected to an RF transmission/reception circuit 240 through communication lines 232 and 234. Circuit 240 is connected to the previously described antenna 138 mounted to the upper body of vehicle 210. Detailed structure of control circuit 230, RF circuit 240, and their collision avoidance functions in accordance with the invention are subsequently described herein. Transmission lines 236 and 238 depicted in FIG. 3 denote further means for providing input/output communications between control circuit 230 and its external environment.

Figure 4:
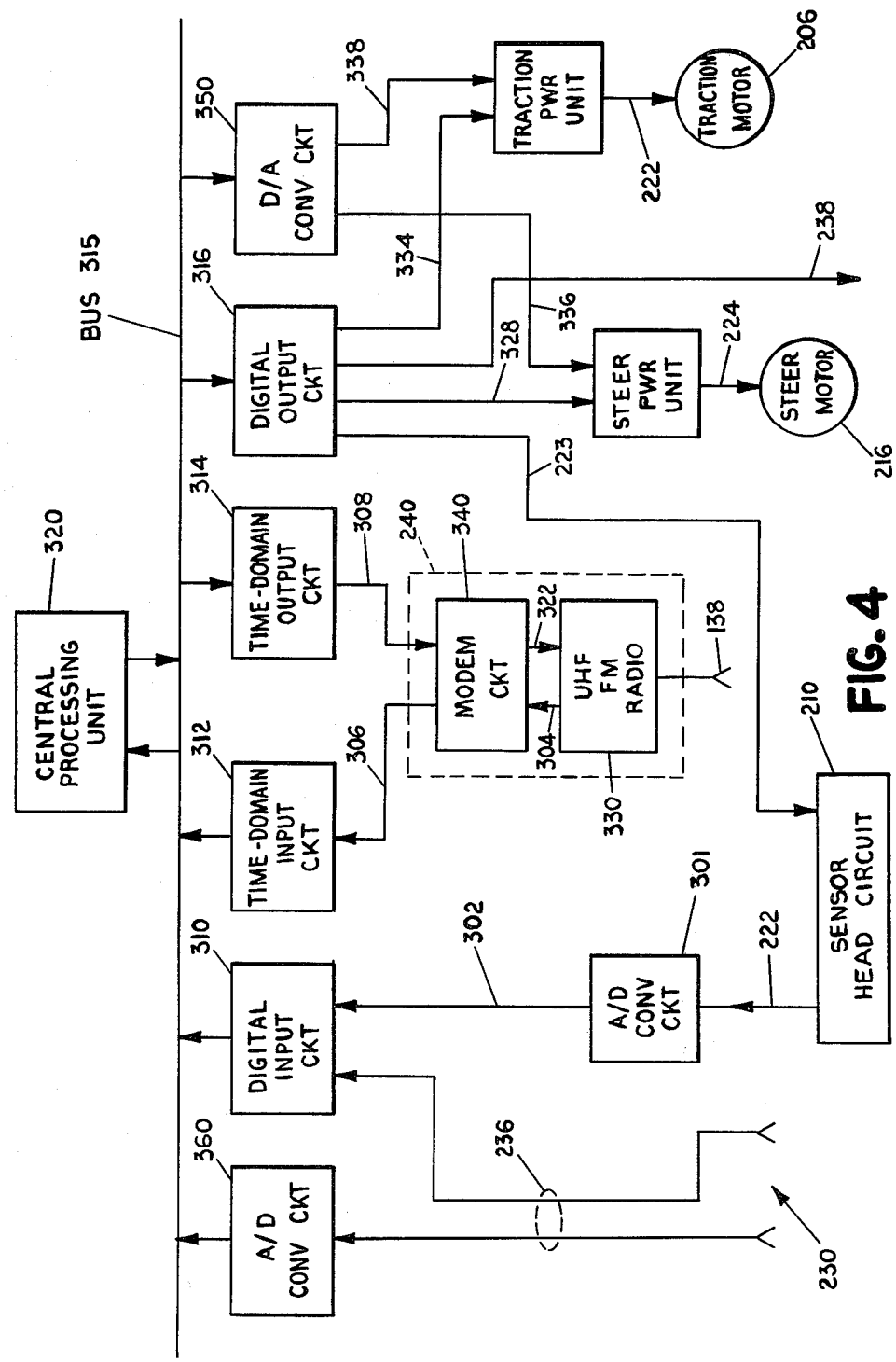
FIG. 4 is a schematic block diagram of one illustrative embodiment of a collision avoidance system operable on the vehicle depicted in FIG. 2.

FIG. 4 depicts a detailed block diagram of the control circuit 230 shown in FIG. 3 and its interconnections with sensing head 210 and other electrical apparatus of one of the vehicles 110. Circuit 230 provides a means responsive to signals indicative of sensor head detections to control vehicle motion and collision avoidance procedures.

Figure 5:
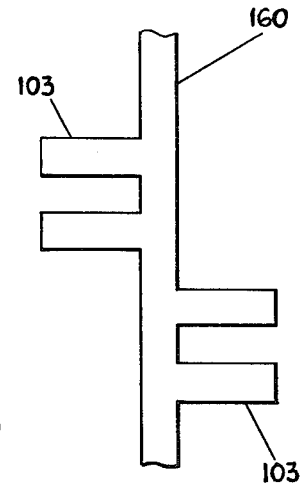
FIG. 5 is a schematic illustration of a guide line of the guide path depicted in FIG. 1 with code markings thereon.

As shown in FIG. 4, the sensor head 210 generates an analog intelligence output signal on line 222 which is applied as an input signal to translation circuit 301. The intelligence signal on line 222 contains information pertaining to the lateral deviation of vehicle 110 from guide line 160 of path 102 and also includes information indicating the presence or absence of a "code". A code in accordance with the invention is any means which can be detected by the sensor head 210 to provide indication of a particular relative position along a guide line 160 of path 102. For example, a code can comprise a series of "spikes" 103 extending perpendicularly to the guide line 160 as depicted in the enlarged view of FIG. 5. Information is coded within the spikes by designating a spike on the right side of the guide line as corresponding to a binary "one" while left side spikes correspond to a binary "zero". Accordingly, a code "word" comprises binary coded information having a predetermined number of digits corresponding to the number of spikes. A code of this type and the manner in which the sensor head 210 detects a code is described in the aforementioned DeBruine patent application.

The translation circuit 301 to which the intelligence signal on line 222 is applied comprises a conventional level translator and analog to digital conversion circuit. Circuit 301 applies a resultant output signal on transmission line 302 comprising digital information signals in the form of binary pulses corresponding to the analog intelligence signal from the sensor head 210.

The digital signals on transmission line 302 are applied as input signals to translation multiplexer circuit 310. Circuit 310 is a conventional multiplexer circuit which performs level translation, filtering, and multibit latching of the digital signal from line 302. The resultant output signal is a level translated parallel signal which is applied to conventional bus 315. Circuit 310 is well-known in the art and can, for example, comprise circuitry commercially available from the Intel Company. Bus 315 is also well known in the art and comprises both a bidirectional data bus and an address bus. Signals on bus 315 can be applied between various of the circuits depicted in FIG. 4 as subsequently described herein.

Though not comprising requisite circuitry in accordance with the present invention, FIG. 4 also depicts other input transmission lines 236 which can be applied to the translation circuit 310. For example, information which is manually coded into the keyboard 136 depicted in FIG. 2 can have representative digital signals applied to translation circuit 310 and correspondingly applied to bus 315. Such encoded input information signals can be utilized, for example, to "preset" the various drop zones at which the vehicle 110 is to stop. Other information in the form of analog signals can be directly applied to a conventional analog to digital conversion and multiplexer circuit 360 by means of other transmission lines 236. Circuit 360 converts the analog signals to corresponding digital signals for utilization by various other components of the control circuit 230. For example, one analog signal can correspond to the battery voltage of the various storage batteries in the vehicle 110. This voltage could be routinely monitored at predetermined periods of time to ensure that no battery malfunctions are occuring and to generate appropriate external warning should such a malfunction occur.

Control circuit 230 is interconnected with the RF transmission/reception circuit 240 as depicted in FIG. 4. In accordance with the invention, circuit 240 provides a means for communication between its attendant vehicle 110 and other vehicles 110 operating on guide path 102. In the illustrative embodiment depicted in FIG. 4, circuit 240 comprises a UHF FM radio 330 having the antenna 138 connected thereto and structurally depicted in FIG. 2. Radio 330 provides a means for spatially transmitting and receiving tonal information signals between the vehicles 110. Radio circuit 330 is a conventional circuit and can, for example, be one of the "MAXAR 80" Series radios commercially available from the Motorola Corporation.

Tone signals from other vehicles received at radio circuit 330 by means of the antenna 138 are applied as analog input signals to modem circuit 340 through line 304 as depicted in FIG. 4. Modem circuit 340 is a conventional interface circuit which is responsive to the signals on line 304 to apply corresponding digital output signals to transmission line 306. Circuit 340 is also well-known in the art and can, for example, be one of the Bell System "202D" Data Set Series modems.

The corresponding digital signals on transmission line 306 are applied as input signals to a time domain translation circuit 312. Circuit 312 operates in real time by utilization of a receiver clock therein and applies corresponding output signals to the bus circuit 315. Circuit 312 can be characterized as a universal asynchronous/synchronous receiver/transmitter and circuits of this type are commercially available from the Intel Company.

Signals appearing on the bus circuit 315 can be applied to the transmission/reception circuit 240 by means of the translator time-domain circuit 314 as depicted in FIG. 4. Circuit 314 is similar to the previously described translation circuit 312 and converts parallel signals from bus 315 to serial digital signals which are applied to transmission line 308. The digital signals on line 308 are applied as input signals to the modem circuit 340 which, in turn, applies corresponding analog signals through transmission line 322 to the radio circuit 330 which provides spacial transmission thereof.

Signals received on bus 315 from the previously described circuitry depicted in FIG. 4 can be applied to various other circuitry of control circuit 230. For example, parallel digital signals on bus 315 can be applied directly to the central processing unit (CPU) 320. Unit 320 provides a means for storing predetermined information signals and generating digital signals in response to signals received on bus 315 in accordance with the prestored information. CPU 320 can comprise any one of numerous commercially available processor and memory configurations, one of which is subsequently described herein.

As further depicted in FIG. 4, output signals from CPU 320 can be applied to the bidirectional bus 315 and then applied to other circuitry of the attendant vehicle 110. Certain of these signals as subsequently discussed herein can be applied to the previously described time domain translation circuit 314 which in turn applies corresponding signals through transmission line 308 to the transmission/reception circuit 240. Other signals can be directed to the demultiplexer translation circuit 316. Circuit 316 comprises conventional circuitry for demultiplexing and level translating signals from the bus 315. These translated signals can have any one of numerous functions. For example, when the vehicle 110 is to be stopped, a translated signal can be applied on transmission line 238 to activate vehicle brake lights mounted to the rear of vehicle 110. Other signals on line 238 can be applied to either of the caution lights 132 to visually indicate the direction that is to be taken by the vehicle 110 as it is approaching an intersection.

Other signals which are directed through the demultiplexer circuit 316 can also be applied to transmission line 328 and correspond to steering "enable" signals which are, in turn, applied as input signals to steering power unit 335. Additional digital signals can be applied through demultiplexer circuit 316 to the transmission line 334 and correspond to traction "directional" signals which are, in turn, applied to the traction power unit 345.

Still further signals on bus 315 can be directed to transmission line 223 as input signals directly to the sensor head circuit 210. These signals can, for example, correspond to command signals to the sensor head 210 for commanding the following of either the left or right edge of a guide line of guide path 102. The function of performing left or right edge following and circuitry in accordance therewith is described in the aforementioned DeBruine patent application.

Other digital signals appearing on bus 315 can be applied to conversion circuit 350 as shown in FIG. 4. Circuit 350 is a conventional demultiplexer circuit which provides a digital to analog conversion function. Resultant analog signals corresponding to the digital input signals from bus 315 are applied to either the transmission line 338 as traction "command" signals or to transmission line 336 as steering "command" signals. Traction command signals on line 338 are applied as input signals to the traction power unit 345 while steering command signals appearing on line 336 are applied as input signals to the servo power unit 335.

Steering power unit 335 is responsive to the previously described steering command and steering enable signals to apply an operational signal on transmission line 224 to the steering motor 216. A steering power unit and motor corresponding to unit 335 and motor 216 depicted in FIG. 4 are generally described in the aforementioned DeBruine patent application.

The traction power unit 345 is responsive to the traction command signals on line 338 and the traction directional signals on line 334 to generate operational signals on line 226 which are applied to the traction motor 206. The traction motor 206 provides an energizing means to move the vehicle 110. A power unit 345 and traction motor 206 which can be utilized in the vehicle 110 is disclosed in the U.S. patent application to Houskamp Ser. No. 113,357 filed Jan. 18, 1980, now U.S. Pat. No. 4,341,985 issued July 27, 1982.

Figure 6:
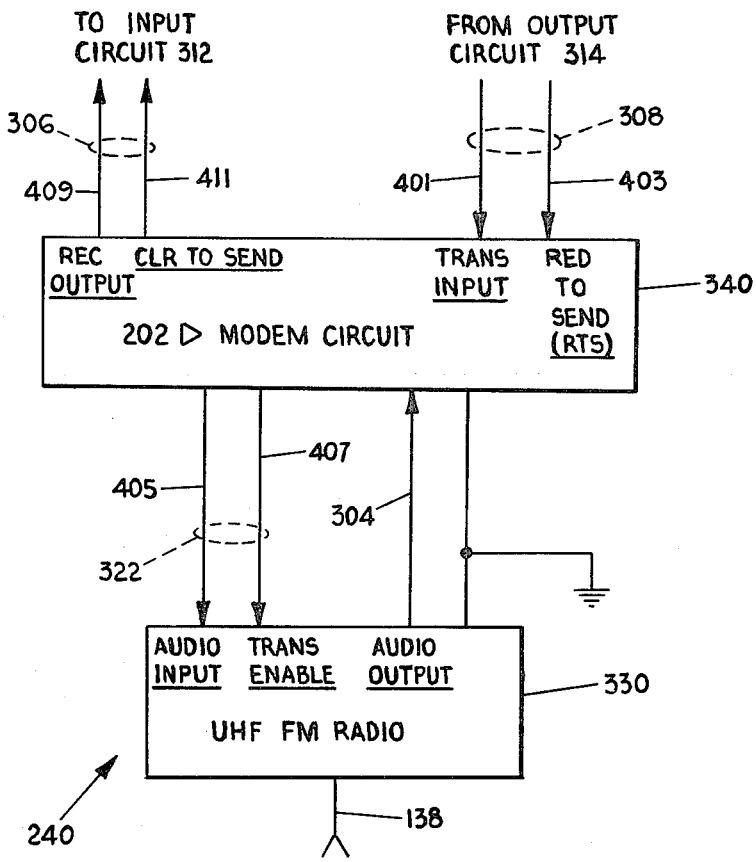
FIG. 6 is a schematic block diagram of interconnections between the RF transmitter/receiver and modem circuitry depicted in FIG. 4.

FIG. 6 depicts a schematic diagram of the reception/-transmission circuit 240. The previously described input transmission line 308 connected to the modem 340 comprises a pair of conductors 401 and 403. Conductor 401 is utilized to apply serial digital pulses to the modem 340 which correspond to requisite tone signals to be transmitted by the RF circuit 240. Conventional clocking signals to provide requisite clocking of the data on conductor 401 are applied as input signals on conductor 403. As previously described, the modem circuit 340 converts the serial input pulses to corresponding analog tone signals and applies these tone signals to transmission line 322. As depicted in FIG. 6, transmission line 322 comprises an input conductor 405 on which the actual analog tone signals are applied and a conductor 407 on which a transmission "enable" signal is applied to the radio circuit 330. Circuit 330 is responsive to these signals to transmit corresponding spacial tone signals by means of antenna 138.

Signals received from the radio circuit 330 are directly applied as analog tone signals to the transmission line 304 comprising a single conductor as depicted in FIG. 6. These analog tone signals are applied as input signals to the modem circuit 340 which converts the analog signals to corresponding serial binary pulses. These pulses are applied to the time-domain translation circuit 312 depicted in FIG. 4 by means of conductor 409. Also applied to the translation circuit 312 is a conventional "clear to send" clocking signal on conductor 411.

Figure 7:
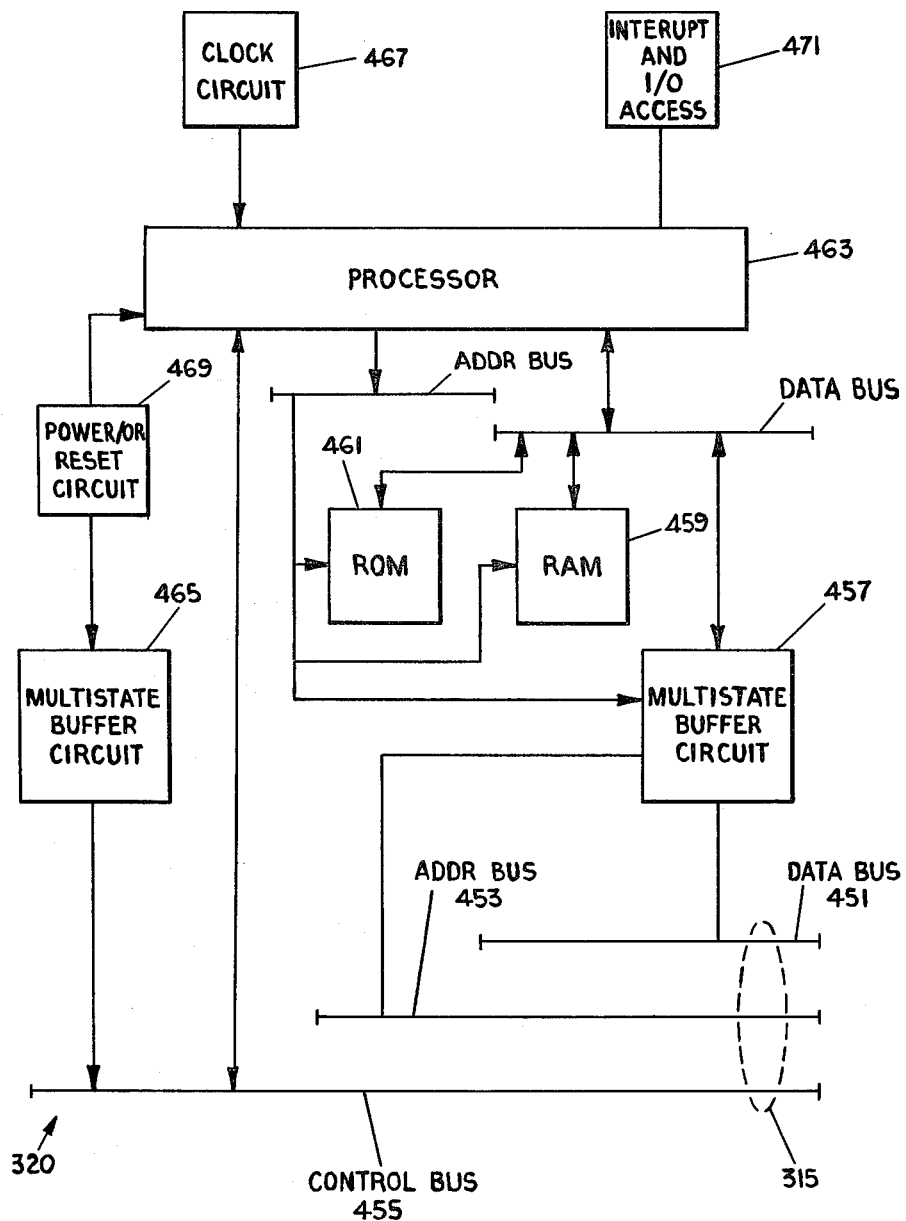
FIG. 7 is a schematic block diagram of an illustrative embodiment of the central processing unit depicted in FIG. 4.

FIG. 7 depicts an exemplary embodiment of the central processing unit (CPU) 320 shown in FIG. 4. As shown therein, bus 315 as interconnected to CPU 320 comprises functionally distinct data bus 451, address bus 453, and control bus 455. Data bus 451 is connected to conventional mulistate bus buffer circuitry 457 and can bidirectionally communicate therewith in the form of eight digit parallel binary signals. Circuitry 457 is also connected to address bus 453 and can apply sixteen digit parallel binary address signals thereto for directed communication between CPU 320 and the various other circuitry connected to bus 315 and previously described herein.

The buffer circuitry 457 is further connected to a random access memory (RAM) 459, "read-only" memory (ROM) 461, and processor 463. Processor 463 can apply sixteen digit binary address signals to either of the memories 459 and 461, and to the buffer circuitry 457. The address signals are utilized to access data signals which are bidirectionally transferrable between the aforementioned circuitry and processor 463.

Conventional system control is provided by interconnection between processor 463, a further multistate bus buffer circuitry 465, and control bus 455. Requisite communication in the form of CPU control signals well established in the art can occur between the aforementioned CPU components to provide operational control thereof. CPU 320 also comprises external clocking control circuit 467, reset circuit 469, and interrupt and input/output access circuitry 471, all circuits connected to processor 463. These circuits and their functional operations within central processing units are well known in the art. The RAM 459 and ROM 461 can comprise 4,096 and 8,192 8-bit word addressable structures, respectively. As previously mentioned, any one of numerous commercially available central processing units can be adapted for use as CPU 320. For example, a PRO-LOG 7801 processor unit can be utilized.

Figure 8:
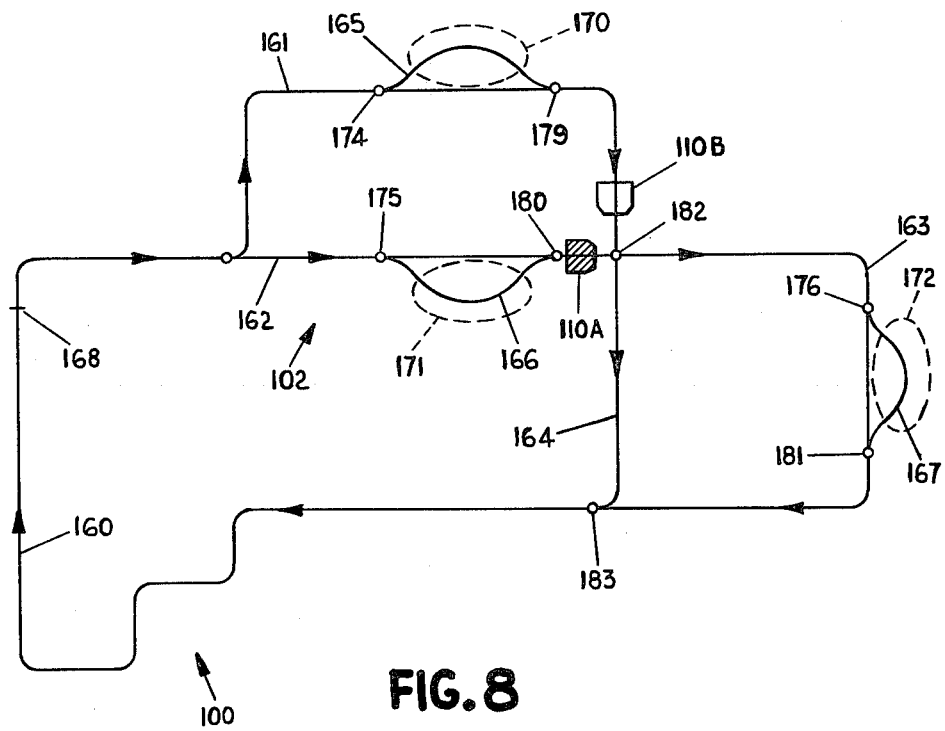
FIG. 8 depicts the guide path shown in FIG. 1 with automatically controlled vehicles at specific positions thereon.

In accordance with the invention, the system 100 structurally described herein is adapted to provide collision avoidance functions for automatically controlled vehicles 110 operating on the guide path 102. To exemplify these functions, vehicle positions as depicted in FIG. 8 will be utilized. For purposes of description, the vehicles depicted in FIG. 8 will be referred to as vehicle 110A and 110B as shown therein.

Referring to the circuitry depicted in FIG. 4 and the situation shown in FIG. 8, as vehicle 110A approaches intersection 182, the sensing head 210 of vehicle 110A travels over a code on guide line 160 which will hereinafter be referred to as a "geographic" code. This code can be any combination of "spikes" as previously described with respect to FIG. 5. The code is effectively "read" by sensing head 210 and signals are generated therefrom on transmission line 222 as previously described herein which are indicative of the specific code configuration. These code indication signals are applied to the central processing unit 320 through the previously described circuits 301 and 310, and the bus 315. The CPU 320 is responsive to these encoded signals to generate various output signals in accordance with collision avoidance procedures. This code marking has indicated to the vehicle 110A that it is entering a congestion zone and certain functions must be performed to avoid any possibility of a collision. Other digital signals, such as the previously described signals on line 326 to activate vehicle brake lights, can also be applied to the bus 315 as appropriate.

Output signals are applied through the time domain translation circuit 314 to the RF transmission/reception circuit 240 and corresponding tone signals are consistently transmitted by means of antenna 138 to determine if any other vehicle, such as vehicle 110B, is within the "zone" of possible collision surrounding intersection 182. After transmitting the requisite "interrogating" or "polling" signals, the RF transmission/reception circuit 240 is electrically configured to receive radio frequency signals transmitted by other vehicles, such as vehicle 110B.

If no signals are received within a predetermined period of time through the RF transmission/reception circuit 240 indicative of other vehicles being within the congestion zone surrounding intersection 182, certain other functions are then performed by the circuitry depicted in FIG. 4. First, energizing signals are transmitted on bus 315 and other circuitry previously described to the traction motor 206 in the aforementioned manner and the vehicle 110A proceeds through the intersection 182 and transfers from guide line 160 to either of guide lines 163 or 164 as determined by preset information signals stored in control circuit 230. This transfer process between guide lines can be accomplished by following guide line edges as described in the aforementioned DeBruine patent application.

Information signals indicative of vehicle 110A being within the congestion zone surrounding intersection 182, and thus "blocking" intersection 182, are then stored in a conventional format within the CPU 320. Through the previously described signals which are applied to bus 315 through multiplexer conversion circuit 360 and through use of conventional counters within the control circuit 230, the distance traveled by the vehicle 110A since detection of the guide line code indicating entrance to the congestion zone is iteratively updated, and signals corresponding thereto are maintained in the counters. The "distance traveled" information signals are repetitively compared with signals indicative of the predetermined distance which must be traveled by vehicle 110A before it "clears" the congestion zone surrounding intersection 182.

With vehicle 110A being within the congestion zone surrounding intersection 182, it is assumed for purposes of description that vehicle 110B now approaches the congestion area on guide line 161 surrounding the intersection 182. The circuitry on each of the vehicles 110A and 110B is substantially identical and, accordingly, FIG. 4 can be utilized for description of the functional operations performed by the vehicle 110B circuitry. The sensor head circuit 210 on vehicle 110B passes over a geographic code on guide line 161 which is indicative of the vehicle approaching the intersection 182. As previously described with respect to vehicle 110A, the sensor head circuit 210 applies information signals to the multiplexer input circuit 310 and bus 315 which indicate the sensing of the geographic code. Upon processing of these information signals, the CPU 320 applies signals on bus 315 to the RF transmission/reception circuit 240. Circuit 240 transmits corresponding spatial tone interrogating signals receivable by other vehicles on guide path 102.

These spatial tone signals contain information in a predetermined format that vehicle 110B is entering the specific congestion zone. Returning to vehicle 110A, the RF transmission/reception circuit 240 thereof receives these tone signals from vehicle 110B and applies corresponding information signals through the time domain translation circuit 312 and bus 315 to CPU 320. However, vehicle 110A has maintained information signals which indicate that it is presently in the "contested" congestion zone as previously described. Therefore, the control circuit 230 of vehicle 110A transmits, by means of RF transmission/reception circuit 240, "blocking" tone signals indicative of its presence in the collision zone.

The tone signals transmitted by vehicle 110A indicative of its presence in the congestion zone are correspondingly received by the circuit 240 on vehicle 110B. When the control circuit 230 processes these received "blocking" signals, it prohibits motion of the vehicle 110B into the collision zone by ceasing to apply energizing signals to its traction motor 206.

At predetermined intervals of time, the control circuit 230 on vehicle 110B will then transmit further spacial tone signals which, in effect, provide a "polling" function to determine if the congestion zone surrounding intersection 182 has been "cleared". When vehicle 110A has determined, by "distance" comparisons as previously described, that it has cleared the congestion zone, it will no longer transmit blocking signals in response to polling signals received from vehicle 110B. When vehicle 110B no longer receives these blocking signals, energizing signals are applied to the traction motor 206 thereof, and vehicle 110B proceeds through the intersection 182.

Figure 9:
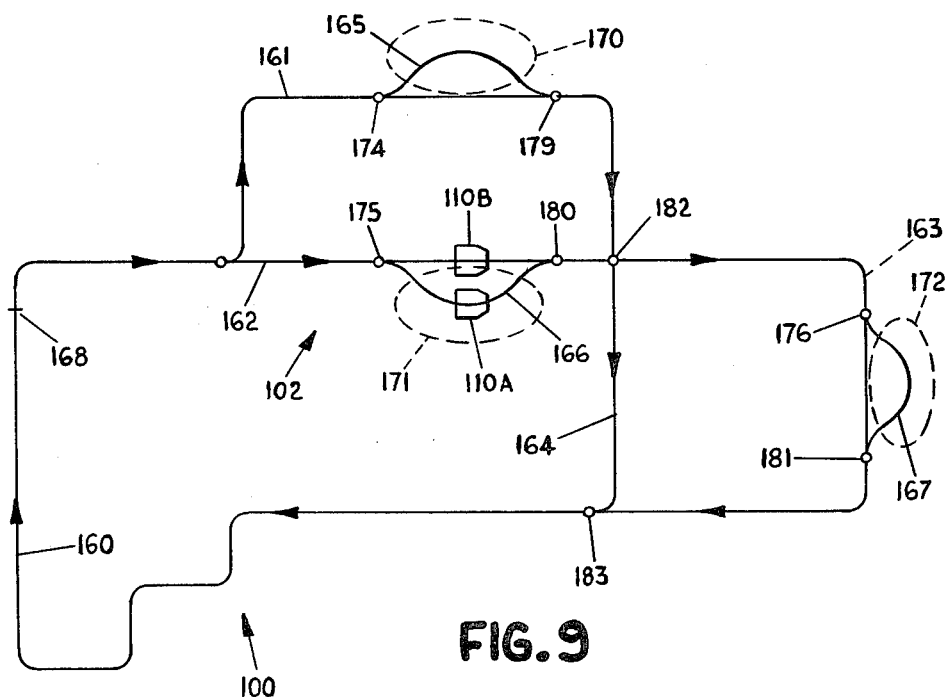
FIG. 9 depicts the guide path and vehicles shown in FIG. 8 with the vehicles at differing positions along the guide path.

FIG. 9 illustrates a further positional vehicle situation where collision avoidance procedures are performed in accordance with the invention. As shown in FIG. 9, vehicle 110A is stopped on guide line 166 within drop zone 171. Vehicle 110B has bypassed drop zone 171 and is proceeding along guide line 162 toward intersection 180. If vehicle 110A were to immediately proceed toward intersection 180 upon activation thereof, a probability of collision would exist.

To overcome this problem, vehicle 110B will have sensed, by means of sensing head circuit 210 as previously described, a geographic code on guide line 162 when it approached intersection 175. At that time, vehicle 110B will transmit polling signals indicating that it is approaching intersection 175 and it will bypass drop zone 171. With vehicle 110A stopped within drop zone 171 on guide line 161, it will not transmit blocking signals in response to the polling signals transmitted by vehicle 110A. Accordingly, vehicle 110B has proceeded through intersection 175. However, as vehicle 110A is activated, polling signals as previously described with respect to FIG. 8 will be transmitted by its RF circuit 240. Vehicle 110B will respond with blocking signals until it has cleared intersection 180. Accordingly, vehicle 110A will not proceed until intersection 180 is clear.

The previously described procedures for collision avoidance in accordance with the invention have certain inherent problems which must be overcome to assure that "handshaking" procedures can effectively operate in all possible situations. For example, it is possible that the two vehicles 110A and 110B "simultaneously" sense the geographic codes on 162 and 161 respectively, indicating entry into the congestion zone surrounding intersection 182. The two vehicles could then attempt to transmit "polling" signals at substantially the same instant of time. Since the RF transmission/reception circuit 365 cannot simultaneously transmit and receive signals, reception of signals indicating possible blocking could be "missed" and hazardous conditions would occur.

To overcome this problem, and in accordance with the invention, each vehicle, upon detection of a geographic code indicating entry into a congestion zone, transmits a corresponding sychronization tone signal. It then "waits" a predetermined amount of time, designated "quiet" time, before transmitting its polling signals having information concerning its entry position to the congestion zone. However, the interval of quiet time is made unique for each vehicle operable on guide path 102. For example, with 8 operative vehicles having respective identity numbers 1 through 8, the quiet time for each vehicle can be a function of its identity number, such as 200 milliseconds multiplied by the unique identity number. It is apparent that any functional relationship can be utilized which will preclude repetitive transmission of tone signals indicative of entry into a collision zone by a plurality of vehicles from occuring at substantially simultaneous instants of time.

Additionally, for practical operation in an industrial environment, the collision avoidance system must provide for possible errors in message transmission and reception. Accordingly, if a vehicle receiving tone signals from another vehicle determines that an error has occurred (by conventional means such as parity checking, Hamming codes, or similar error detection functions), the receiving vehicle can transmit tone signals requesting message repetition by the originating vehicle. Further, the control circuit 230 can include means for counting the number of errors occuring in a predetermined period of time and transmitting audio alarm signals to transmission line 326 depicted in FIG. 4, thereby indicating the necessity of manual intervention should such errors become excessive.

A further problem can occur when the vehicles which are used in an industrial environment on guide path 102 comprise a plurality of trailers for material handling purposes. Such vehicles can be of substantial length and can therefore be simultaneously within more than one congestion zone. Accordingly, the control circuit 230 should allow for the storage of information signals indicative of the vehicle being within two or more congestion zones simultaneously.

As previously described, the control circuit 230 can comprise a CPU 320 for purposes of storing, processing, and generating requisite information signals for operation of the collision avoidance system. FIGS. 10 through 13 depict an illustrative embodiment of a memory structure and operational sequence diagrams which can be utilized for implementation of a collision avoidance system in accordance with the invention.

Figure 10:
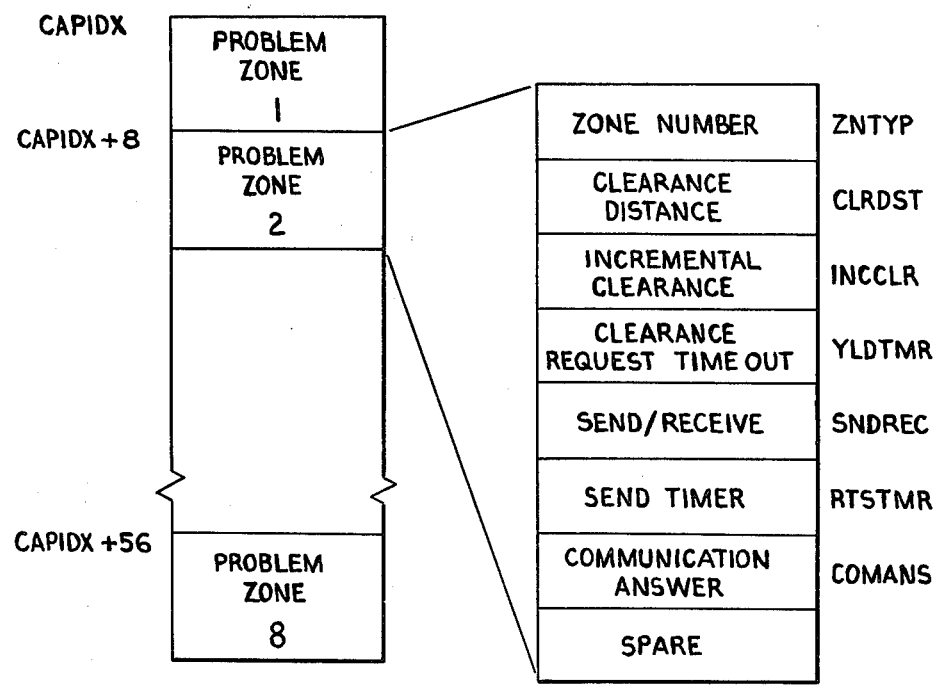
FIG. 10 depicts an illustrative embodiment of a memory structure of the central processing unit shown in FIG. 7.

FIG. 10 depicts a general structural layout which can be utilized in RAM memory 459 of CPU 320 to store information signals pertaining to collision avoidance operations. The memory structure depicted in FIG. 10 is merely descriptive of one type of structure which can be utilized in accordance with the invention. It will be apparent to one skilled in the art after reading this specification that numerous other structures can be utilized. Further, other information signals, such as those stored in ROM 461 previously described herein, can be stored in ony one of numerous conventional formats.

As previously described, RAM 459 can comprise 4096 eight bit adressable memory words. When the geographic code has been detected and the corresponding permanent information signals obtained, the CPU 320 operates to reserve a "free" eight word memory block within the 64 word block labelled CAPIDX as shown in FIG. 10. After the block has been reserved, the first word thereof, designated ZNTYP in FIG. 10, is utilized to store information signals corresponding to the particular geographic code detected by sensor head circuit 210. The second word CLRDST of the reserved memory block is utilized to store information signals indicative of the remaining distance which the corresponding vehicle must travel prior to "clearing" the intersection as previously described herein. Accordingly, word CLRDST is utilized only when the vehicle is presently causing a blockage of the intersection in question.

Word INCCLR provides storage of information signals corresponding to an incremental "clear distance" and provides a bookkeeping counter for determining when the vehicle in question has cleared an intersection. Word YLDTMR corresponds to a "yield" timer and provides a means for storing information signals corresponding to a "time-out" function for requesting clearance for purposes of transmitting tone signals over RF transmission/reception circuit 240. If the circuit 240 does not receive a "clearance" to transmit signals within a predetermined period of time, alarm signals can be applied to bus 315 by CPU 320 to request manual intervention. Word SNDREC is utilized to store information signals for purposes of communicating between various sequences to indicate when there is a request to send tonal signals and when an answer has been received from the transmission/reception circuit 240.

Word RTSTMR provides means for storing information signals corresponding to a timer which is activated when there is a request to send tonal signals over the RF circuit 240. If there is a request to send such messages, and the circuit 240 does not provide clearance for such transmission within a predetermined period of time, alarm signals can be activated and manual intervention can be requested. Word COMANS provides a register storage location for information signals corresponding to received messages.

Other memory locations which are not unique to any one specific geographic code detection can also be utilized in RAM 459. For example, such "common" memory locations can be utilized to store zone numbers indicating to message configuration sequences the particular zone for which a message (polling signals, blocking signals) is to correspond. These memory locations and the types of operational sequences necessary for implementation of requisite communications are well within the knowledge of persons skilled in the electrical communications art having knowledge of the present invention.

Figure 11:
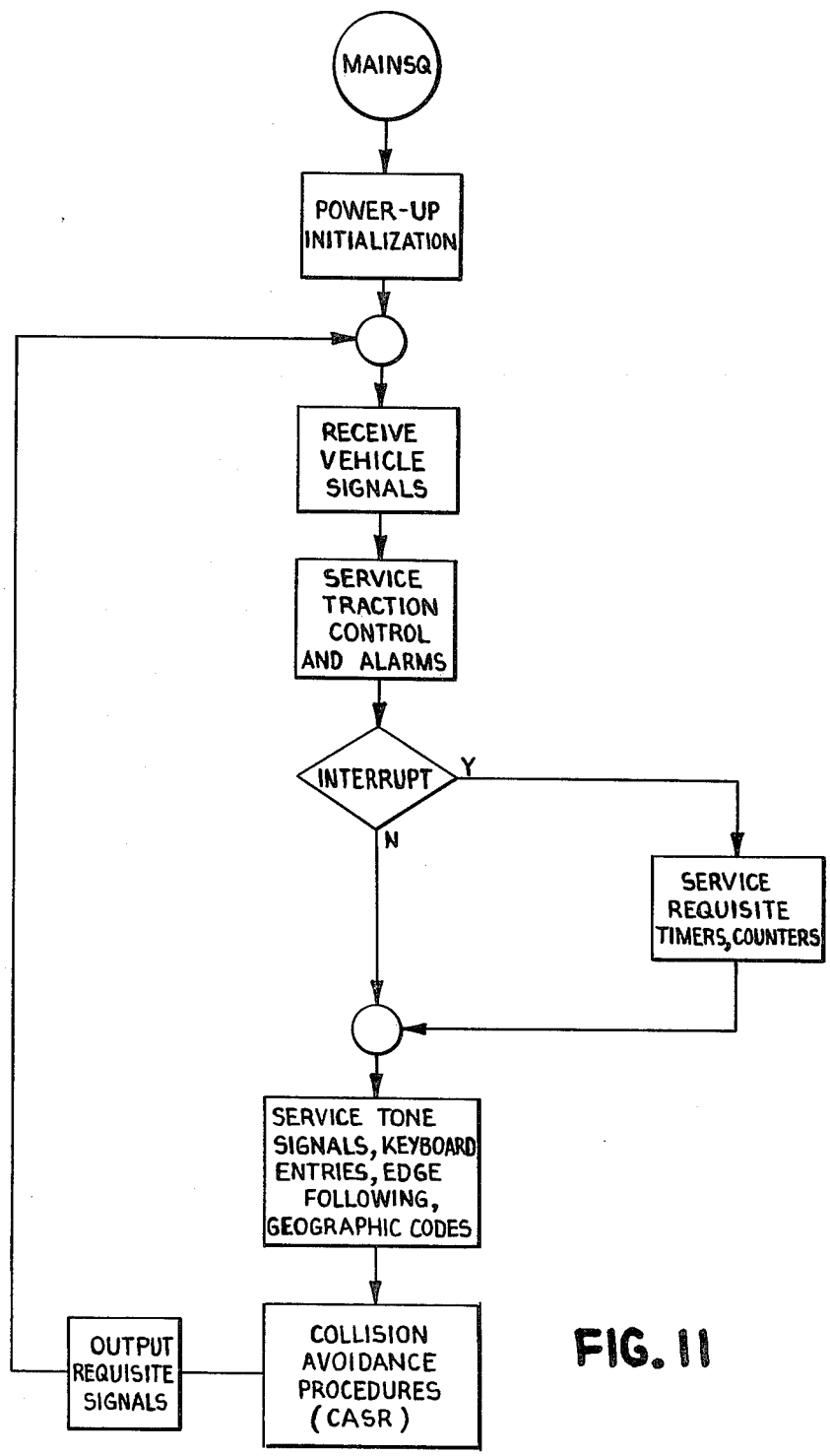
FIGS. 11 through 13 depict sequence diagrams illustrating in detail functions associated with the vehicle collision avoidance system.

FIG. 11 shows a diagram for a real time operational sequence which can be utilized with the collision avoidance system. The sequence begins at a main entry point MAINSQ and comprises a repetitive sequence which is utilized to receive and transmit various information signals for accomplishing collision avoidance and general operation of the vehicle guidance system. Upon functional entry to MAINSQ, general initialization functions are performed, such as activation of battery power, etc. Following initialization, the system receives various vehicle parameters which have been applied to the CPU 320 through bus 315. These vehicle parameters can be in the form of signals indicative of characteristics such as vehicle velocity, distance travelled since the last reception of vehicle parameters, and like characteristics. Other input signals are also received at this time. For example, manual input from keyboard 136 depicted in FIG. 2 can be received in the form of information signals on bus 315 and are stored in predetermined memory locations of RAM 459. Additionally, if other operational sequences subsequently described herein have set "flag" signals indicating that the attendant vehicle is to stop or proceed, requisite signals can be applied to the previously described traction motor 206.

Following reception of the input information signals and operations pertaining to vehicle traction control, conventional incremental interrupt timers are compared to determine if an operational interrupt sequence is to be executed. This interrupt is utilized since the cycle time of the main sequence MAINSQ can be substantially greater than the intervals of time between which various counters and timing registers should be incremented and other vehicle operations should be executed. A separate "forced" interrupt can also be utilized to service communication signals pertaining to the transmitter/receiver circuit 240. Demand interrupts of this type are well known in the communications arts.

Following requisite interrupt function executions, other general operational sequences can be executed which pertain to both general vehicle operation and to collision avoidance procedures. Certain of these general operations are functionally depicted in FIG. 11 and will not be described in detail herein as they are substantially independent of a collision avoidance system in accordance with the invention. However, one of these operations detects signals from sensing head circuit 210 indicative of the presence of a geographic code. As previously described with respect to FIG. 10, information signals corresponding to the intersection or drop zone identified by the geographic code are stored and made available during execution of collision avoidance sequences.

Following performance of the requisite general operations and collision avoidance actions, the CPU 320 generates any requisite information signals and applies these signals to the bus 315. The sequence MAINSQ then recycles and the functions previously described with respect thereto are repeated. It is apparent that numerous other functions can be performed during the sequence MAINSQ. For example, self-testing procedures can be performed to determine the integrity of the system on a "per cycle" basis.

Figure 12:
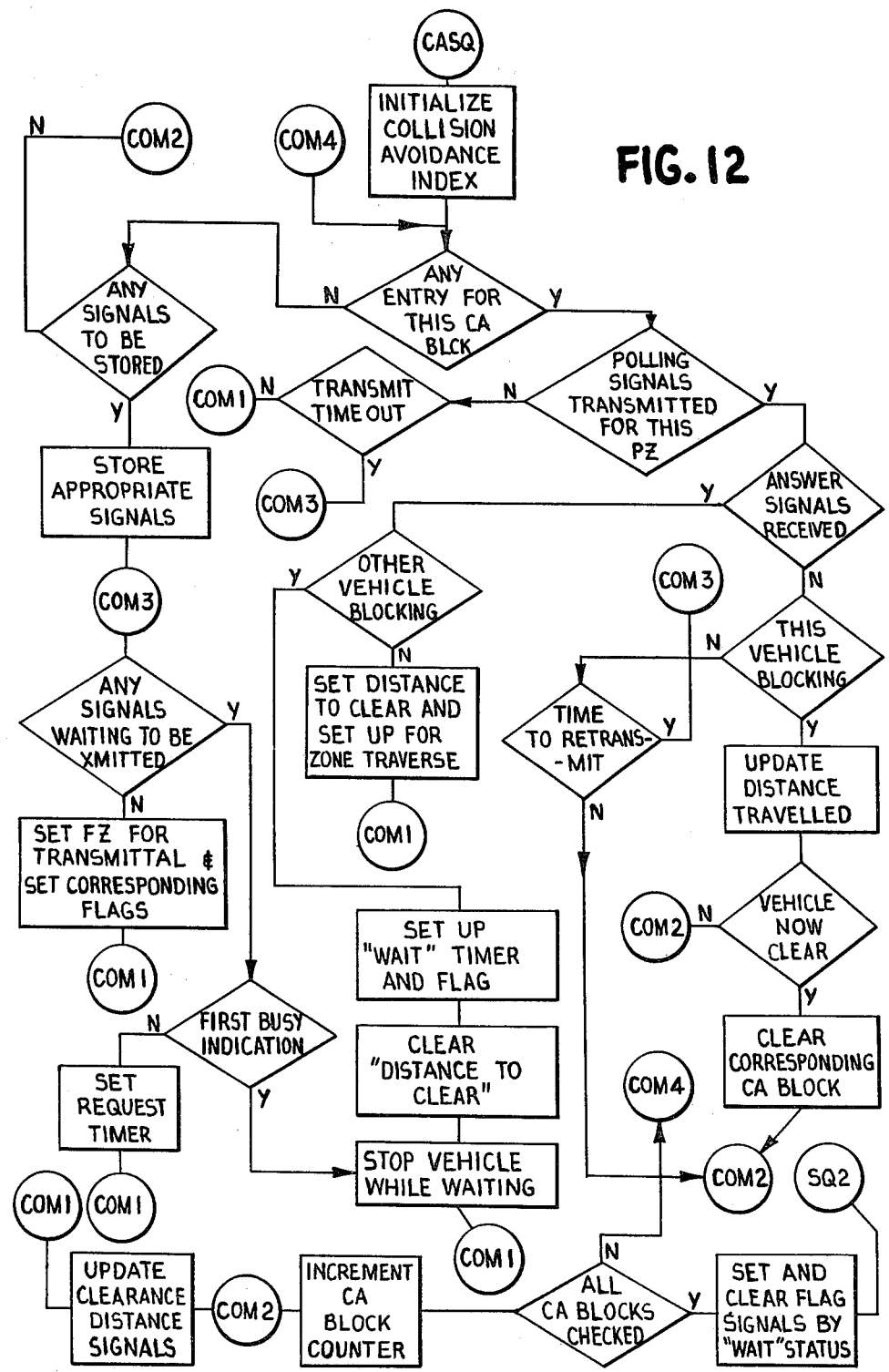
Figure 13:
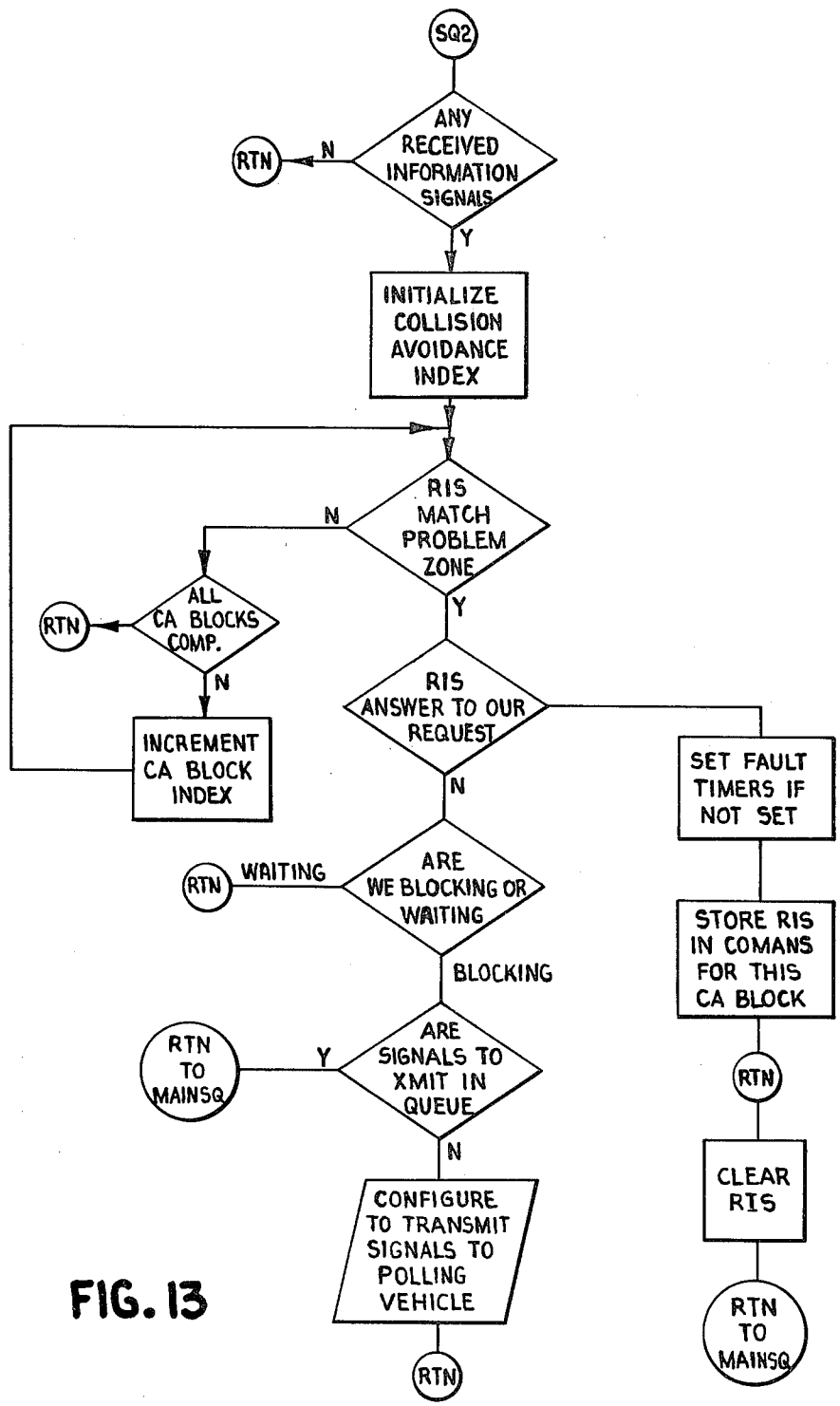

FIGS. 12 and 13 depict exemplary operational sequences for collision avoidance procedures in accordance with the invention. As previously described, the sensing head circuit 210 detects a geographic code and applies corresponding input information signals to bus 315 which are directed to CPU 320. CPU 320 can utilize the specific geographic code to index into its permanent RAM memory 461, wherein predetermined information signals are stored which indicate in part the position of the geographic code on guidepath 102 and actions to be performed upon detection thereof. In the illustrative embodiment described herein, geographic codes at each of the intersections and drop zones are unique. Accordingly, the information signals themselves which correspond to the binary equivalent of the code marks on guide path 102 define the particular intersection or drop zone detected.

Referring specifically to FIG. 12, the operational sequence thereof shows various procedures which can be performed when a geographic code is read from the guide path 102. Functional entry to this sequence can be made at entry point CASQ shown therein. This entry can occur by transfer of functional control from the main sequence MAINSQ previously described with respect to FIG. 11. Upon entry at CASQ, an initialization is performed of a collision avoidance index. This index directs operations to the memory block CAPIDX previously described with respect to FIG. 9, and will be referred to as the "problem zone" signal storage area.

A decision is first made to determine if any entry now exists for the particular collision avoidance block within the problem zone area CAPIDX in question. If no entry presently exists within this block, a decision is made to determine if information signals have been received on bus 315 which are to be stored within an empty block. Such signals would be made available to this operational sequence from the geographic code interpretation sequence depicted in FIG. 11. These signals are existent if a geographic code had been detected by the sensing head circuit 210 and no collision avoidance functions had been executed prior to this time with respect to this particular geographic code.

It is is determined that signals are to be stored, the sequence CASQ stores the appropriate signals within the particular problem zone memory storage area. The stored signals are indicative of an intersection number (stored in ZNTYP previously described with respect to FIG. 10) and information signals indicative of the distance necessary to clear this particular zone (stored in word CLRDST depicted in FIG. 10).

Following the storage of appropriate signals, executional control is transferred through entry point COM3 and a decision is made as to whether any signals are presently "waiting" to be transmitted by means of the RF transmission/reception circuit 240. The determination as to whether signals are waiting to be transmitted can be made by determining if any signals to be transmitted have been stored in a memory location common to all problem zone entries and which correspond to message signals to be transmitted. If signals are presently waiting, then communication is not available at this particular time for transmittal of communication signals, such as the previously described polling signals, relating to this particular problem zone. If it is found that communication is available for purposes of transmitting signals pertaining to this problem zone, then conventional message transmission flag signals can be set as appropriate and functional control transferred to entry point COM1. The flag signals can be utilized by conventional communication sequences to later transmit the appropriate polling signals. To indicate the problem zone to which such polling signals will pertain, the unique intersection or drop zone number can be included within the transmitted polling signals.

Entry point COM1 is a common entry point utilized by various portions of the sequence CASQ. Upon functional entry to COM1, various clearance distances, as previously described, can be updated for this particular problem zone. Additionally, a block counter can be incremented and it can be determined if all of the memory storage blocks within the problem zone storage area have been "serviced" within this execution of sequence CASQ. If all blocks have not been serviced, functional control is transferred to entry point COM4 which repeats the general execution of sequence CASQ. If all blocks have been serviced, various flag signals subsequently described herein can be set or cleared in accordance with whether the attended vehicle has flag signals set within a "wait" memory location indicative of the present status of the attendant vehicle.

Returning to the functional decision as to whether any signals are presently waiting to be transmitted, communication is not yet available if such signals are found. Accordingly, a determination is made as to whether this finding of "busy" communication is the first such indication thereof. If this is the first time that communication has been found to be "busy", then a "request" timer is set to provide an indication as to whether communications may be "locked up" and appropriate alarms should be transmitted. If this is the first communications "busy" indication, then appropriate flag signals are set to cause the vehicle to be stopped. Stoppage of the vehicle occurs through the transmittal of appropriate signals to the traction motor 206 as previously described herein.

If an entry was found to exist for this particular problem zone memory storage block, then a test is made of appropriate flag signals to determine if any polling signals have been transmitted pertaining to this particular problem zone and if such signals have actually been transmitted in the form of tone signals through the utilization of RF circuit 240. If signals have not yet been transmitted by the circuit 240, a determination is made as to whether an appropriate timer circuit has "timed out", indicating that a retransmittal of the polling signals should occur. This retransmittal is made to occur by functional transfer of control to the entry point COM3 previously described herein. If transmittal time-out has not occured, then functional control is immediately transferred to entry point COM1.

If it is found that the polling signals have been transmitted for this particular problem zone, then a determination is made as to whether any answer signals have been received by the RF circuit 240. If such answer signals have not been received, then a determination is made as to whether the attendant vehicle is presently "blocking" this particular problem zone. Such a determination can be made by merely detecting whether a "nonzero" binary memory word presently exists in the CLRDST memory location previously described with respect to FIG. 10. If this memory word is nonzero, then the attendant vehicle is presently blocking the problem zone and the distance traveled by this vehicle is updated. A determination is then made, by comparison with the predetermined distance necessary to travel to clear this problem zone, as to whether the attendant vehicle is presently "clear" of the problem zone. If the vehicle is clear of the problem zone, then information signals within this particular problem zone memory storage block are cleared and control is transferred to the previously described entry point COM1. If the vehicle is not yet found to be clear, then control is transferred to the entry point COM2 which bypasses the functional sequence of updating the present clearance distance signals.

If it is found that the attendant vehicle is not blocking the particular zone, then this problem zone is presently being blocked by another vehicle. A timer is then checked to determine if a repetitive polling signal should be transmitted. If a polling signal is not to be transmitted at this time, then functional control is transferred to entry point COM1. If the timer indicates that a further polling signal should be transmitted, then functional control is transferred to the previously described entry point COM3.

If it is determined that an answer signal has been received, then a test is made to determine if the answer indicates that another vehicle is blocking this particular problem zone. If it is found that other vehicles are not blocking this problem zone, then a clearance distance is set within this problem zone memory storage block and appropriate flag signals are set to cause the vehicle to travel through this intersection or drop zone as defined within this particular problem zone. Functional control of sequence CASQ is then transferred to entry point COM1. If it is found at this time that another vehicle is blocking this particular problem zone, then a "wait" timer and appropriate flag signals are set and the memory word CLRDST is cleared. Other flag signals are also set to cause the vehicle to stop while it is waiting for other vehicles to clear this particular zone.

After the various procedures functionally depicted in FIG. 12 are completed, control is transferred to entry point SQ2 as depicted in FIG. 13. The collision avoidance functions defined in the operational sequence of FIG. 13 mainly relate to functions pertaining to the "answering" of requests from other vehicles. A test is first made to determine if information signals have been received from other vehicles. If no signals have been received, functional control is returned to the main sequence MAINSQ designated in FIG. 13 as transfer of control to "RTN". If it is determined that information signals have been received from other vehicles, then initialization of a collision avoidance index similar to that described with respect to FIG. 12 is executed. For purposes of description, the term "RIS" as shown in FIG. 13 refers to "received information signals". Following initialization of the collision avoidance index to the problem zone memory storage blocks, a test is made of the received information signals to determine if information encoded therein "matches" the intersection or drop zone defined by this particular problem zone. If no match occurs, then the collision avoidance index is incremented to the next problem zone memory storage block unless all such blocks have been compared, at which time control is returned to sequence MAINSQ.

If a match of the received information signals is found, then a determination is made by the testing of appropriate flag signals to determine if these signals were an "answer" to a transmitted request made by this particular problem zone. If these signals are an answer to this particular problem zone request, then various fault timers are set (if not previously set), and the received information signals are stored for later procedures in this particular collision avoidance block. The received information signals are then cleared from input and a return is made to the main sequence MAINSQ.

If the received information signals are not an answer to a request made by this particular problem zone, then a determination is made as to whether the attendant vehicle is presently blocking the problem zone in question or whether it is presently waiting for clearance of this problem zone. If it is presently waiting for clearance, then the signals received are not of importance and they are cleared and a return made to sequence MAINSQ. If it is found that the attendant vehicle is presently blocking this particular zone, then the received information signals can correspond to polling signals requesting the present status of the attendant vehicle. A determination is then made as to whether blocking signals to be transmitted to the requesting vehicle are presently within a message transmittal queue. If such blocking signals are not presently queued, then the collision avoidance circuitry is configured to transmit the appropriate signals to the polling vehicle. If signals to be transmitted are presently queued, then the appropriate blocking signals cannot be configured to be transmitted until subsequent cycles are executed and the sequence SQ2 is repeated. Accordingly, a return is made to the main sequence MAINSQ without clearance of the received information signals.

As apparent to those skilled in the electrical communication arts, other operational sequences must be utilized in combination with the particular sequences described herein and depicted in FIGS. 11 through 13. However, such sequences are well known in the art and are common to numerous message transmittal and reception control circuits. For example, conventional communication operational sequences can be utilized to format message signals for the particular RF transmission/reception circuit 240 to be utilized and to check "integrity" of received messages from circuit 240.

The principles of the collision avoidance invention are not limited to the specific vehicle guidance arrangement described herein. For example, the clearance of a vehicle from a particular congestion zone can be determined by also utilizing coded markings on a guide path indicating vehicle clearance. It will be apparent to those skilled in the art that modifications and other variations of the above-described illustrative embodiment of the invention made be effected without departing from the spirit and scope of the novel concepts of the invention.

The embodiments of the invention in which an exclusive property or privilege is claimed are defined as follows:

1. In an automatic guidance system having first and second self-propelled vehicles adapted to follow a predetermined guidepath having an intersecting portion defining a potential congestion zone on a floor surface, each of said vehicles having energizing means for driving the vehicle along said guidepath, the improvement which comprises:
    marker means on said floor surface a spaced distance from said intersecting portion of said guidepath for indicating the proximity of said intersecting portion on said guidepath;
    first sensing means on said first vehicle to detect said marker means and for generating a first proximity signal responsive thereto;
    first transmitter means on said first vehicle and connected to said first sensing means for transmitting a polling signal responsive to said first proximity signal;
    first receiver means on said first vehicle for detecting spatial communication signals generated by said second vehicle;
    second sensing means on said second vehicle for detecting said marker means and generating a second proximity signal responsive thereto;
    second receiver means on said second vehicle for receiving said polling signal;
    second transmitter means on said second vehicle for transmitting a blocking signal in response to said polling signal when said second vehicle is within said potential congestion zone;
    said first receiver means on said first vehicle is responsive to said blocking signal for generating a stop signal corresponding thereto; and
    first control means on said first vehicle coupled to said first receiver means for disabling said energizing means of said first vehicle in response to said stop signal generated by said first receiver means until such time as said blocking signal is no longer received by said first receiver means, whereby said first vehicle will automatically stop when approaching said potential congestion zone as long as said second vehicle is passing therethrough.

2. An automatic guidance system in accordance with claim 1 characterized in that said system further comprises means for detecting said second vehicle being clear of said congestion zone.

3. An automatic guidance system in accordance with claim 2 characterized in that said second transmitter means ceases transmission of said blocking signal in response to detection of said second vehicle being clear of said congestion zone.

4. An automatic guidance system in accordance with claim 2 characterized in that said control means enables said first vehicle energizing means in response to detection of said second vehicle being clear of said congestion zone.

5. An automatic guidance system in accordance with claim 1 characterized in that said second transmitter means is further responsive to said second proximity signal for transmitting a further polling signal indicative of said second vehicle approaching said congestion zone.

6. An automatic guidance system in accordance with claim 5 characterized in that said first receiver means is adapted to receive said further polling signal and to generate information signals corresponding thereto; and
    said first transmitter means on said first vehicle is responsive to generation of said information signals for transmitting a blocking signal when said first vehicle is passing through such congestion zone.

7. An automatic guidance system in accordance with claim 1 characterized in that said system further comprises:
    second control means on said second vehicle connected to said second sensing means and responsive to said second proximity signal for applying to said second transmitter means an information signal indicative of said marker means being detected by said second sensing means; and
    said second transmitter means on said second vehicle is connected to said second control means on said second vehicle and is responsive to said information signal to spatially transmit a further polling signal corresponding to said information signal.

8. An automatic guidance system in accordance with claim 7 characterized in that said first receiver means is adapted to receive said further polling signal and to apply to said first control means a further information signal corresponding to said further polling signal;
    said first control means is responsive to said further information signal corresponding to said further polling signal and to signals indicative of the position of said first vehicle along said guidepath to apply a said further information signal to said first transmitter means when said first vehicle is within said congestion zone; and
    said first transmitter means is connected to said first control means and is responsive to said further information signal to transmit a further blocking signal corresponding thereto.

9. An automatic guidance system in accordance with claim 8 characterized in that said second receiver means is adapted to receive said further blocking signal transmitted by said first transmitter means on said first vehicle and apply to said second control means an information signal corresponding thereto; and said second control means is responsive to said information signal applied by said second transmitter means to disable said second vehicle energizing means.

10. An automatic guidance system in accordance with claim 9 characterized in that said second transmitter means is adapted to repetitively transmit said second polling signal at predetermined intervals of time until such time that no blocking signals are received by said second receiver means.

11. An automatic guidance system in accordance with claim 10 characterized in that said first transmitter means transmits said further blocking signal in response to said repetitive second polling signal when said first vehicle is within said congestion zone.

12. An automatic guidance system in accordance with claim 11 characterized in that said predetermined intervals of time are a function of a unique identification of said second vehicle.

13. An automatic guidance system in accordance with claim 2 characterized in that said means for detecting said second vehicle being clear of such congestion zone comprises means for detecting the distance travelled by said second vehicle within said congestion zone.

14. In an automatic guidance system having first and second self-propelled vehicles adapted to follow a predetermined guidepath having an intersecting portion on the floor surface, each of said vehicles having energizing means for driving said vehicles along said guidepath, the improvement which comprises:

means for applying activating signals to said first vehicle energizing means when said first vehicle is stopped on said guidepath;

transmitter means on said first vehicle responsive to said activating signals for transmitting a polling signal;

receiver means on said second vehicle for detecting said polling signal;

transmitter means on said second vehicle for transmitting a blocking signal in response to said receiving means on said second vehicle receiving said polling signal when said second vehicle is within a predetermined area on said guidepath;

receiver means on said first vehicle for detecting said blocking signal and for generating a stop signal corresponding thereto; and control means on said first vehicle coupled to said receiver means on said first vehicle and responsive to said stop signal for prohibiting application of said activating signals to said first vehicle energizing means until such time as said blocking signal is no longer received by said receiver means on said first vehicle, whereby said first vehicle will remain stopped on said guidepath as long as said second vehicle is passing through said predetermined area.

15. A method for prohibiting collisions between first and second vehicles adapted to follow a predetermined guidepath having an intersecting portion defining a potential congestion zone on a floor surface, said method comprising the steps of:

(a) sensing the approach of said first vehicle into said intersecting portion;

(b) transmitting from said first vehicle a polling signal in response to the sensed approach of said first vehicle into said intersecting portion;

(c) receiving said polling signal at said second vehicle and transmitting a blocking signal in response thereto only when said second vehicle is within said collision zone;

(d) receiving said blocking signal at said first vehicle; and (e) stopping said first vehicle in response to said blocking signal and prohibiting said first vehicle from entering said intersecting portion until such time as said blocking signal is no longer received at said first vehicle.

16. A method for prohibiting collisions between first and second vehicles automatically guided along a guidepath having intersecting guide lines, said method comprising the steps of:

(a) sensing the approach of said first vehicle to a guidepath intersection and generating polling signals from said first vehicle indicative thereof;

(b) receiving said polling signals from said first vehicle at said second vehicle;

(c) transmitting blocking signals from said second vehicle in response to said polling signals only when said second vehicle is within a predetermined zone surrounding said guidepath intersection; and (d) ceasing movement of said first vehicle in response to reception by said first vehicle of said transmitted blocking signals.

17. The method in accordance with claim 24 characterized in that said method further comprises:

(a) transmitting from said first vehicle additional polling signals at predetermined intervals of time;

(b) waiting a further predetermined interval of time after transmitting said additional polling signals and generating energizing signals to establish movement of said first vehicle through said guidepath intersection in the absence of blocking signals received by said first vehicle during said further predetermined interval of time.

* * * * *